Figure 1:
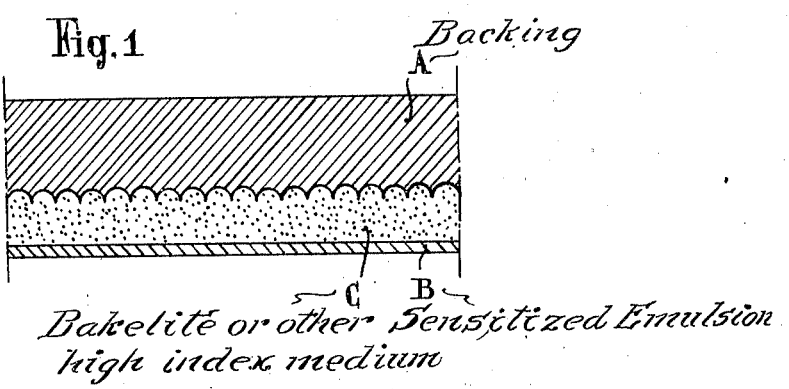

March 26, 1929.       R. BERTHON       1,707,157

FILM FOR MOTION PICTURES IN COLOR

Filed June 18, 1926

A — Backing
C   B — Sensitized Emulsion
Bakelite or other high index medium

A — Backing
C'   B — Sensitized Emulsion
Gelatine or other low index medium

INVENTOR:
Rodolphe Berthon
BY
ATTORNEY.

Patented Mar. 26, 1929.

1,707,157

UNITED STATES PATENT OFFICE.

RODOLPHE BERTHON, OF NEUILLY SUR SEINE, FRANCE.

FILM FOR MOTION PICTURES IN COLOR.

Application filed June 18, 1926, Serial No. 116,903, and in France January 9, 1926.

For the purpose of solving the problem of producing motion pictures in natural colors, there has been proposed, in the prior art, the use of films the "backing" of which has, on its free side, an infinity of juxtaposed microscopic refracting elements. Experience has shown that such films are perfectly suitable for this purpose and are just as serviceable for unlimited reproduction as for reprinting.

For the said result two requirements must be fulfilled. It is necessary that:

(1) The microscopic elements be optically perfect, without any opaque or rough spaces between them.

(2) The diameter of said microscopic elements be an accurate function of the relative aperture of the camera employed, of the thickness of the film and of the curvature of the said microscopic elements themselves.

Thus with cameras having an F/2,5 aperture (the most practical one, as a rule), a film thickness of .12 to .13 mm. and a curvature of .04 mm., the diameter of the elements must itself be very nearly .04 mm. Practically, the reckoning is from 22 to 23 elements per linear millimeter.

Now then, persons skilled in the art are aware that the enlargements currently adopted for motion picture theaters imply as regards images a sharpness of the order of .02 mm. In other words, the sharpness of the projected picture is ensured only if the image on the film is constituted by elements or points less than .02 mm. in size.

The consequence is that a film embodying refracting elements at the rate of 22 per linear millimeter, that is to say measuring 4.5 mm., cannot give an impression of sharpness on ordinary screens; such an impression would only commence to be obtainable with screens reduced to one fourth of their present area.

Therefore, a film with microscopic elements can only be used for the same theaters as the black-print film subject to the refracting elements being reduced to a size of less than .02 mm.

The laws of optics show, however, that such a result would be possible only with films not exceeding .06 mm. in thickness, which would offer no resistance and would be unusable with the reels to be found on the market.

The object of my invention is to provide a process of manufacturing motion picture film which will permit the refracting elements in the sensitized coating to be arranged as closely as desired and, consequently, the size of the said refracting elements to be reduced.

According to my process, the film is constituted by two index media, the partition surface of which has engraved thereon, in hollow and relief, suitable microscopic elements.

Figure 2:
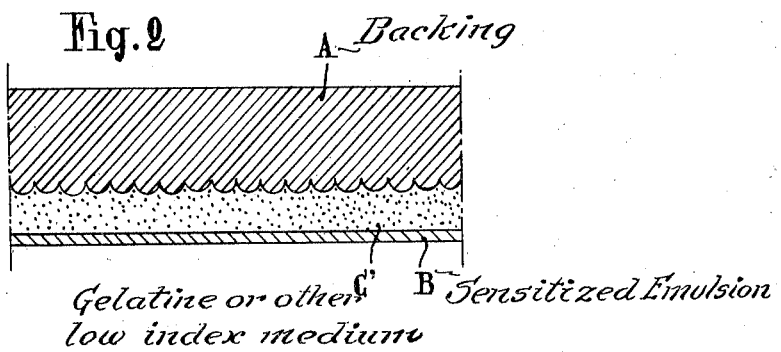

In the accompanying drawing, Figure 1 is a fragmental sectional view, on a greatly-enlarged scale, of a film in which the engraving is in hollow; and Fig. 2 is a similar view, but with the engraving in relief.

I obtain such films primarily in the following manner:—

I print on a transparent backing, as found in the trade, an engraving reproducing in hollow the elements of the selected type, I cover said engraving with a solution having an index different from the one adopted, and, lastly, I lay on the sensitized emulsion.

According as the index of the solution employed is higher or lower than the one of the backing proper, the engraving imprinted on the backing will offer its curved faces in hollow or in relief; films so obtained will, therefore, assume, respectively, the appearances illustrated in Figs. 1 and 2, wherein A and B denote, respectively, the backing proper and the sensitized emulsion.

It should be clearly understood that, with my process and without altering the engraving, sensitized layers suitable for various cameras can be prepared by simply modifying the thickness of the layer of the index body different from the index body on the backing.

In Figure 1, C denotes the higher index solution or medium, while in Figure 2, C' denotes the lower index medium.

Among the high index bodies suitable for the purposes, I will instance especially phenolic resins (bakelites), and among the low index ones, gelatines.

A practical manner of performing my invention is, consequently, as follows:

First, I roll out a backing by means of a cylinder or roller carrying in relief semi-cylindrical striæ less than 0.1 mm. in curvature and joined;

Then I cover the striated face with a thick bakelite solution in a vehicle that will not attack the backing;

Next, I harden the bakelite so as to develop its utmost resilience;

Finally, I deposit the emulsion.

A film so constituted is applicable for all the uses of film with superficial refracting elements, while ensuring for the images a sharpness equal to the one of ordinary blackprint films.

I claim as my invention:

1. Film for motion pictures in color, comprising a transparent backing, a transparent median layer thereon, and a layer of sensitized emulsion on the outer face of the median layer; the backing and the median layer having different indices of refraction, said backing having its separating face formed by a multitude of microscopic refracting elements.

2. Film for motion pictures in color, comprising a transparent backing, a transparent median layer thereon having a higher index of refraction than the backing, and a layer of sensitized emulsion on the outer face of the median layer; said backing having its separating face formed by a multitude of microscopic refracting elements.

3. Film for motion pictures in color, comprising a transparent backing, a layer of transparent bakelite thereon, and a layer of sensitized emulsion on the outer face of the bakelite layer; said backing having its separating face formed by a multitude of microscopic refracting elements.

4. Film according to claim 3, in which the bakelite layer is hardened to develop its maximum resilience.

In testimony whereof I affix my signature.

RODOLPHE BERTHON.